United States Patent [19]

Baldwin

[11] Patent Number: 4,773,865

[45] Date of Patent: Sep. 27, 1988

[54] TRAINING MANNEQUIN

[76] Inventor: Jere F. Baldwin, 4283 Guilford, Port Huron, Mich. 48060

[21] Appl. No.: 66,491

[22] Filed: Jun. 26, 1987

[51] Int. Cl.$^4$ .............................................. G09B 23/30
[52] U.S. Cl. .................................. 434/268; 434/274; 434/267; 434/272
[58] Field of Search ............... 434/265, 267, 268, 270, 434/272, 274, 275; 623/9, 12

[56] References Cited

U.S. PATENT DOCUMENTS

| | | | |
|---|---|---|---|
| 2,752,697 | 2/1955 | Lawall | 434/268 |
| 2,904,898 | 9/1959 | Marsden | 434/265 |
| 3,152,404 | 10/1964 | Cheshire et al. | 434/265 |
| 3,199,225 | 10/1965 | Robertson et al. | 434/265 |
| 3,520,071 | 7/1970 | Abrahamson et al. | 434/265 |
| 3,562,924 | 2/1971 | Baermann et al. | 434/265 |
| 3,704,529 | 12/1972 | Cioppa | 434/272 |
| 3,872,609 | 3/1975 | Smrcka | 434/265 |
| 3,916,535 | 11/1975 | Hewson | 434/265 |
| 4,060,856 | 12/1977 | Edwards | 633/9 |
| 4,182,054 | 11/1980 | Wise et al. | 434/268 |
| 4,209,919 | 7/1980 | Kirikae et al. | 434/270 |
| 4,331,426 | 5/1982 | Sweeneey | 434/265 |
| 4,484,896 | 11/1984 | Kohnke | 434/265 |

FOREIGN PATENT DOCUMENTS

| | | | |
|---|---|---|---|
| 2505097 | 8/1975 | Fed. Rep. of Germany | 434/272 |
| 0632351 | 9/1982 | Switzerland | 434/267 |
| 563686 | 6/1977 | U.S.S.R. | 434/265 |

*Primary Examiner*—Samuel Scott
*Assistant Examiner*—Carl D. Price
*Attorney, Agent, or Firm*—Brooks & Kushman

[57] ABSTRACT

A training mannequin which exhibits many of the tactile sensations of a real human body to a student. The mannequin includes an anatomically correct human skeleton including a skull, a jawbone and a spinal column which together define a throat cavity. An anatomically correct larynx and its associated trachea are disposed in the throat cavity. A plastic skin covers the mannequin and a plastic packing material is utilized between the skin covering and the skeleton. An inflatable member is disposed in a chest cavity defined by ribs and the spinal column of the skeleton. The inflatable member substantially fills the chest cavity when inflated. An air pump is in fluid communication with the inflatable member to inflate the inflatable member. A student can insert a sharp instrument, such as a needle, through the skin and into the larynx, or between the ribs and into the inflatable member to deflate the member. A source of simulated blood is fluidly connected to the femoral veins as well as to the external jugular vein adjacent to the larynx so that a student can insert a needle in one of the veins. Preferably, a bulb syringe is fluidly connected to the femoral arteries to that upon manual actuation of the syringe the student can feel a pulse therein.

11 Claims, 2 Drawing Sheets

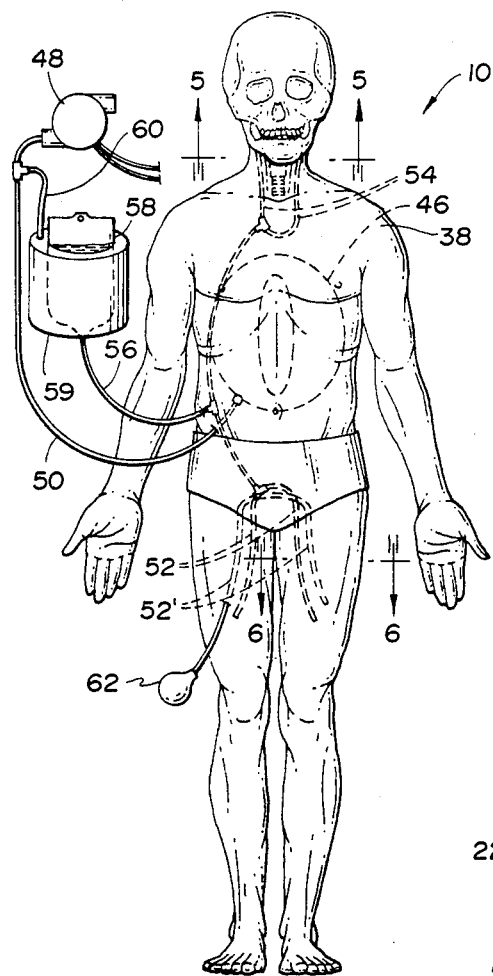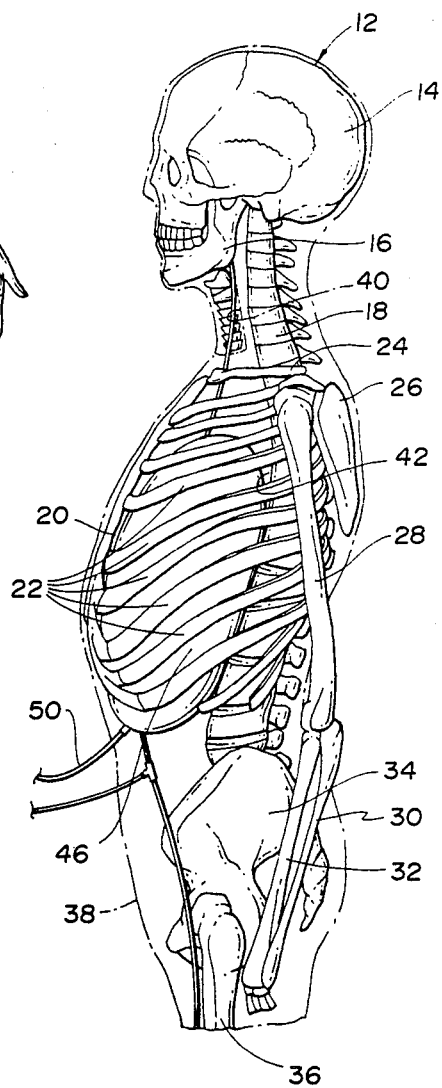
Fig. 1
Fig. 2

TRAINING MANNEQUIN

TECHNICAL FIELD

This invention relates to teaching mannequins and, in particular, to teaching mannequins which simulate many of the tactile sensations of a real human body.

BACKGROUND ART

Mannequins which are available for use as teaching aids are oftentimes quite expensive and, consequently, are not available to many of the institutions which could benefit greatly by having them.

Teaching mannequins should simulate the human body so as to provide the student or trainee with the opportunity to realistically practice and thus become proficient as to the particular technique to be taught. The more natural and life-like in appearance, feel and tactile resistance, the better the teaching mannequin is able to teach the student. Such teaching mannequins prove the efficacy of medical training and reduce the substantial hazards involved in the use of live patients during the teaching process.

It is often difficult, unpleasant and sometimes hazardous to teach or train students to stick needles or other sharp instruments into another human. In many situations the health risk involved does not offset the potential eductional benefits. For example, some students must learn how to properly insert a needle into a distressed person's larynx, chest cavity and blood vessels. Conventional mannequins do not give the student the feeling of a real human body in some of these situations and, accordingly, books must be heavily relied upon for teaching purposes.

U.S. patent to Baermann et al. U.S. Pat. No. 3,562,925 discloses a mannequin having a simulated human torso with a chest cavity which is located in a thorax unit covered with a human-shaped chest plate and adapted to be compressed externally to pump blood-like liquid from a simulated heart into a simultated circulatory system. The chest plate corresponds in size and shape to the human chest to help the trainee locate the heart by touching the proper body area upon which to apply compression to massage the heart correctly.

The U.S. patent to Abrahamson et al U.S. Pat. No. 3,520,071 discloses a training simulator including a mannequin attached in operating position on its back to an operating table. Motion of a chest wall is obtained by providing internal structures for simulating the operation of the human lungs. Vocal cords are positioned along a trachea to form a larynx control.

The U.S. patent to Kirikae et al U.S. Pat. No. 4,209,919 discloses a model of a living body including a cranium and organ components including a tongue and an ear made of yieldable material arranged on the main body.

A number of United States patents disclose resuscitation teaching apparatus which takes the form of a teaching mannequin. Such patents include the following U.S. Pat. Nos. 3,199,225 in the name of Robertson et al; 3,916,535 in the name of Hewson; 2,904,898 in the name of Marsden; 3,152,404 in the name of Cheshire et al and 3,562,924 in the name of Baermann et al.

DISCLOSURE OF THE INVENTION

An object of the present invention is to provide a teaching mannequin which is tactilely similar and which is reusable and relatively inexpensive.

Another object of the present invention is to provide a teaching mannequin which simulates the feel of certain bony, cartilaginous and/or blood vessel structures of a human body so that a student can properly insert a needle or other sharp instrument through the skin of the mannequin and into the structure, thereby simulating an actual medical technique.

In carrying out the above objects and other objects of the present invention, a training mannequin is provided for use in teaching. The mannequin comprises at least a torso of a simulating human body including an anatomically correct inner bone structure having a plurality of spaced, relatively hard ribs and a spinal column to define a chest cavity therebetween. An inflatable member is disposed in the cavity wherein the inflatable member substantially fills the chest cavity when inflated. Generating means is fluidly connected to the inflatable member to inflate and maintain air pressure in the member. Skin covers the spaced ribs and is so constructed to permit each of the ribs to be felt through the skin to allow a student to insert an instrument through the skin, between two adjacent ribs and into the inflatable member to deflate the member.

The inflatable member, when punctured with a needle, allows the creation of an auditory sensation of escaping air and/or light pressure.

Further in carrying out the above objects and other objects of the present invention, a training mannequin for use in teaching comprises at least a head and an interconnected neck of a simulated human body skeleton including an anatomically correct inner bone construction having a skull, a jaw and a spinal column. The jaw and the spinal column define a throat cavity therebetween. A relatively hard larynx is disposed in the throat cavity. The larynx has a longitudinally extending passageway extending therethrough. The larynx includes a thyroid cartilage and a cricoid cartilage connected to the thyroid cartilage. The thyroid cartilage and the cricoid cartilage define an aperture communicating the outer exterior surface of the larynx to the passageway. Skin covers the larynx wherein the skin is so constructed to permit the aperture between the thyroid cartilage and the cricoid cartilage to be felt through the skin to allow a student to insert an instrument through the skin, through the aperture and into the passageway.

Preferably, a resilient material such as a plastic packaging material is disposed between the bone structure and the skin to further simulate a human body.

Also preferably, simulated blood vessels containing simulated pressurized blood are disposed within the teaching mannequin so that the pressurized blood can be tactilely sensed through the skin by a student.

The advantages of a teaching mannequin as constructed above are numerous. For example, such a teaching mannequin is usable by a large number of students at a relatively low cost. Also, such a teaching mannequin has the tactile sensations of a human body by providing substantially anatomically correct bony and/or cartilaginous structures therewithin. In this way, the students is capable of finding various blood vessels, apertures and passageways between and among the structures to insert a needle or other sharp instrument thereinto.

The above objects and other objects, features and advantages of the present invention are readily apparent from the following detailed description of the best mode for carrying out the invention when taken in connection with the accompanying drawings.

BRIEF DESCRIPTION OF THE DRAWINGS

FIG. 1 is a front elevational view of a training mannequin constructed in accordance with the present invention;

FIG. 2 is a side-elevational view, slightly enlarged and partially broken away, with the skin removed;

BEST MODE FOR CARRYING OUT THE INVENTION

Figure 3:
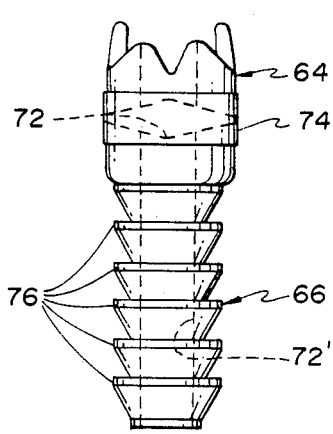
FIG. 3 is a front-elevational view of a larynx and connected trachea which is located in a throat cavity of the mannequin.

Referring now to the drawings, there is illustrated in FIG. 1 a teaching mannequin constructed in accordance with the present invention and generally indicated at 10. As illustrated in FIG. 2, the mannequin 10 includes a anatomically correct skeleton, generally indicated at 12, which comprises either a relatively hard plastic or human skeleton. The skeleton 12 includes a plurality of interconnected bony structures including a skull 14, a jaw 16, a spinal column 18, a sternum 20, a plurality of interconnecting ribs 22, a clavicle 24, a scapula 26, a humerus 28, a radius 32, an ulna 30, a pelvis 34 and a femur 36.

The skeleton 12 is completely covered by a relatively thin plastic skin 38 which simulates actual skin. The plastic skin 38 may, in general, comprise the same type of plastic used in making plastic gloves which allow the user to feel through the plastic and, for example, pick up small coins.

Between the skin 38 and the skeleton 12, there are located various body cavities, including a throat cavity 40 and chest cavity 42. Plastic packing material 44 fills many of the body concavities which are located between the skin 38 and the skeleton 12. The plastic packing material 44 simulates many of the softer parts of a human body.

An inflatable inner tube or member 46 is disposed in the chest cavity 42. The inflatable member 46 is of such a size so that when fully inflated it substantially fills the chest cavity 42. The inflatable member 46 is shown in its fully inflated and deflated conditions by phantom lines in FIG. 1. The inflatable member 46 is fluidly connected to an air pump 48 through a flexible plastic tubing 50 which extends through the skin 38. Air from the air pump 48 expands the inner tube or member 46 so that when a student inserts a needle through the skin 38, between the ribs 22 and into the inflatable member 46, the student is able to hear the release of air. Thereby, the student is able to obtain sensory feedback that he or she is properly performing the medical technique.

The mannequin 10 also includes a plurality of flexible plastic veins and arteries, such as femoral veins and arteries 52 and 52' and external jugular veins 54. In general, the pulse of the femoral artery 52' can be felt. The pressure in the exterior jugular vein 54 can be somewhat felt. However, the position of the jugular vein 54 can be determined based on its known position between the angle of the jaw (i.e. at the back, bottom part of the jaw bone 16) and the middle portion of the clavicle 24.

The femoral veins and external jugular veins 52 and 54, respectively, are fluidly connected through flexible plastic tubing 56 to a bag 58 containing simulated blood. Preferably, an air bag 59, in fluid communication with the air pump 48 through tubing 60, compresses the bag 58 about which it encircles.

The student is able to find each of these blood vessels 52 and 54 based on the anatomically similar landmarks on the mannequin. After finding one of the vessels 52, 52' or 54 the student can insert a needle through the skin 38, through the plastic packing material 44 and into the blood vessel 52, 52' or 54. The simulated blood under pressure will immediately flash into the hub of the needle. Thereby the student is able to obtain sensory feedback that he or she is properly performing the medical technique.

In addition to fluidly connecting the air pump 48 to the air bag 59, a bulb syringe 62 is fluidly connected to the femoral artery 52' so that a simulated pulse within the artery 52' can be used to further facilitate the finding of the vessels 52 and 52'.

Figure 4:
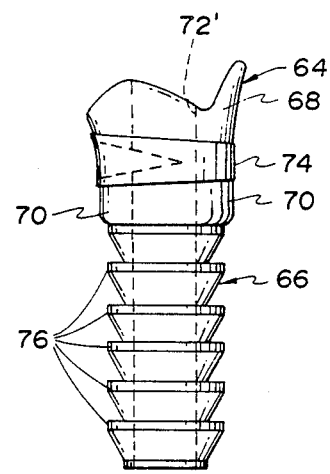
FIG. 4 is a side-elevational view of the larynx and connected trachea of FIG. 3.
Figure 5:
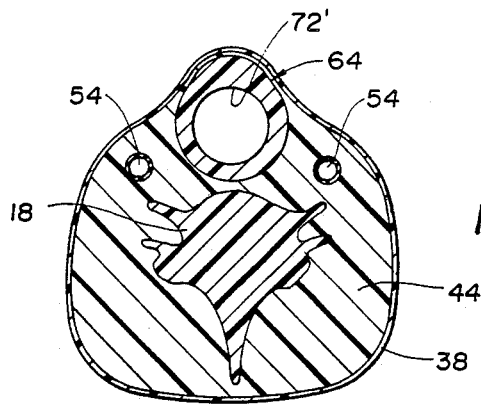
FIG. 5 is a sectional view, taken along the lines 5—5 of FIG. 1.
Figure 6:
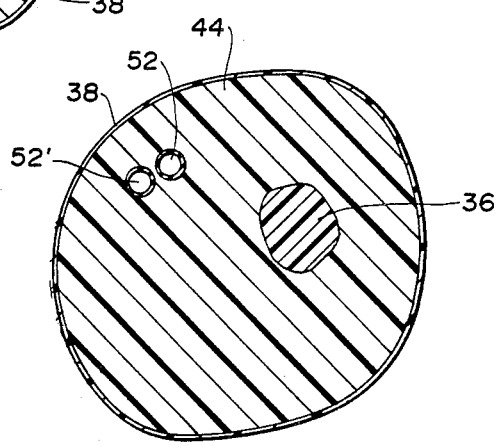
FIG. 6 is a sectional view, taken along lines 6—6 of FIG. 1.

Referring now to FIGS. 3 through 5 there is illustrated a larynx, generally indicated at 64, and an interconnected trachea, generally indicated at 66, which are located in the throat cavity 40. The larynx 64 includes an anatomically correct thyroid cartilage 68 and an interconnected cricoid cartilage 70. The trachea 68 comprises a substantially clyindrical tube having rings 76 which simulate human cartilage. The larynx 64 and the trachea 66 are preferably made from a relatively hard plastic or wood.

A longitudinally extending passageway 72' extends through the larynx and through the trachea 66 and thereby provides an air passageway therethrough. A cricothyroid aperture 72 extends between the front thyroid cartilage 68 and the cricoid cartilage 70 from the outer exterior surface of the larynx 64 to the passageway 72'. The aperture 72 simulates a similar passage in the human larynx. A resilient annulus 74, which preferably comprises a rubber band, is positioned completely over the aperture 72 and overlaps the thyroid cartilage 68 and the cricoid cartilage 70 to simulate a resilient membrane which actually extends therebetween in the human larynx.

The skin 38 allows the aperture 72 between the thyroid cartilage 68 and the cricoid cartilage 70 to be felt therethough to allow a student to insert an instrument, such as a needle, through the skin 38, the aperture 72 and into the passageway 72'.

The advantages accruing to the mannequin 10 as described above are numerous. For example, such a mannequin 10 is relatively inexpensive to construct and is reusable to permit a large number of students to train thereon. Also, by the use of a relatively rigid skeleton and larynx as well as pressurized blood vessels, the students are able to use the tactile sensations normally associated with a human body to learn various lifesaving techniques on the mannequin 10 rather than on a live subject.

While the best mode for carrying out the invention has herein been described in detail, those familiar with the art to which this invention relates will recognize various alternative designs and embodiments for practicing the present invention as defined by the following claims.

What is claimed is:

1. A training mannequin for use in teaching, said mannequin comprising:
   at least a head and interconnected neck of a simulated human body including an anatomically correct inner bone structure having a skull, a jaw and a spinal column, the jaw and the spinal column defining a throat cavity therebetween;
   a relatively hard simulated larynx disposed in said throat cavity, said larynx having a passageway extending longitudinally therethrough, said larynx including a thyroid cartilage and a cricoid cartilage connected to the thyroid cartilage, the thyroid cartilage and the cricoid cartilage defining an aperture communicating the outer exterior surface of the larynx to the passageway;
   an elastic membrane covering the aperture between the thyroid cartilage and the cricoid cartilage and pervious to an instrument; and
   simulated skin for covering said larynx and wherein said skin is so constructed to permit the aperture between the thyroid cartilage and the cricoid cartilage to be felt through the skin to allow a student to insert the instrument through the skin, through the aperture and into the passageway.

2. The mannequin as claimed in claim 1 including a trachea connected to the cricoid cartilage.

3. The mannequin as claimed in claim 1 further comprising a resilient material disposed between the bone structure and the skin.

4. The mannequin as claimed in claim 1 further comprising a torso and at least one thigh portion of a simulated human body, including an anatomically correct inner bone structure having a femur, the thigh position being connected to the torso of the body, the skin also covering the thigh portion to define a blood vessel compartment therein;
   a source of simulated blood; and
   at least one simulated blood vessel previous to an instrument disposed in said blood vessel compartment and fluidly connected to said blood source wherein said skin is so constructed to permit the blood vessel to be felt through the skin to allow a student to insert the instrument through the skin and into the blood vessel.

5. The mannequin as claimed in claim 4 further comprising pressurizing means connected to said blood source for pressurizing the blood to permit the pressurized blood in at least one of the blood vessels to be felt though the skin.

6. The mannequin as claimed in claim 5 wherein said pressurizing means includes means for manually pressurizing at least one of said blood vessels to simulate a pulse.

7. The mannequin as claimed in claim 6 wherein said means for manually pressurizing includes a syringe.

8. The mannequin as claimed in claim 4 further comprising pressure generating means and tubing for fluidly connecting said blood source to said pressure generating means.

9. The mannequin as claimed in claim 1 further comprising:
   a source of simulated blood; and
   at least one simulated blood previous to an instrument vessel disposed in said throat cavity and fluidly connected to said blood source wherein said skin is so constructed as to permit the blood vessel to be felt through the skin to allow a student to insert an instrument through the skin and into the blood vessel.

10. The mannequin as claimed in claim 9 further comprising pressurizing means connected to the blood source for pressurizing the blood to permit the pressurized blood in the blood vessel to enter the hub of a needle inserted in the blood vessel.

11. The mannequin as claimed in claim 8 wherein said pressure generating means includes a fluid pump.

* * * * *